Oct. 23, 1928.
A. W. BELFRY
1,688,374
BATH MITT
Filed Nov. 19, 1927
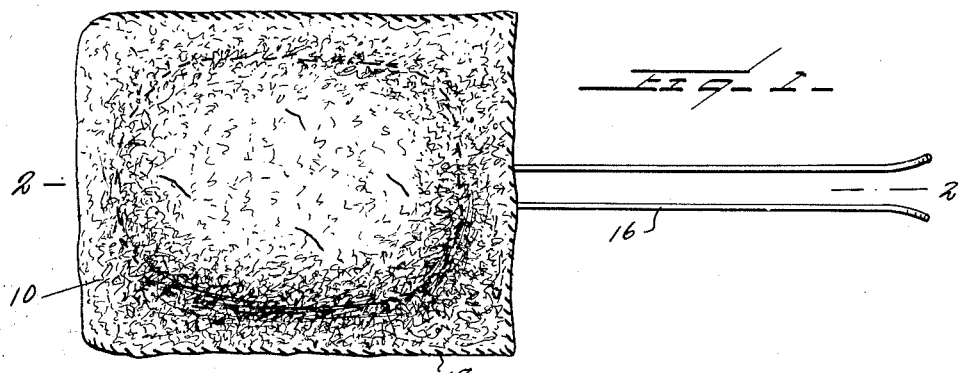
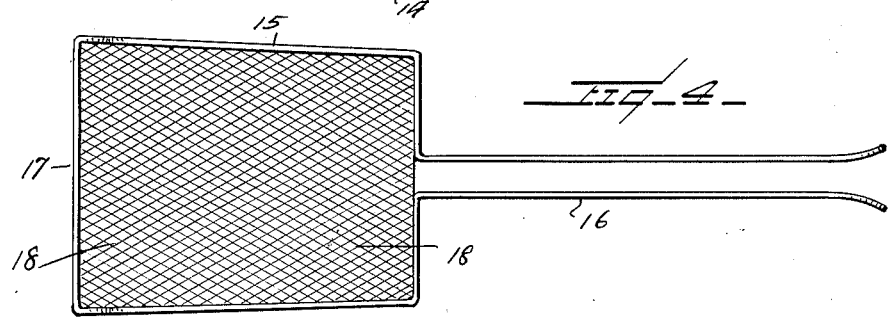
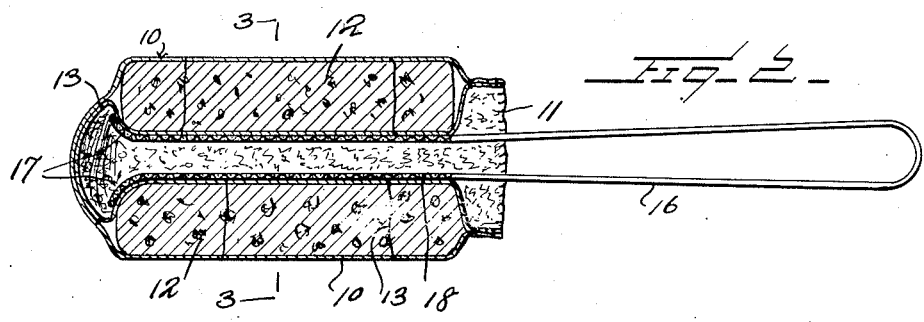
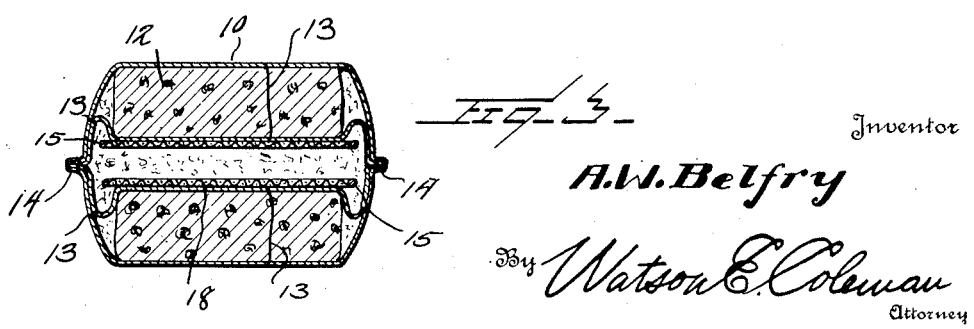
Inventor
A.W. Belfry
By Watson E. Coleman
Attorney Patented Oct. 23, 1928.

1,688,374

UNITED STATES PATENT OFFICE.

ALFRED W. BELFRY, OF DETROIT, MICHIGAN.

BATH MITT.

Application filed November 19, 1927. Serial No. 234,465.

This invention relates to bath mitts and the general object of the invention is to provide a bath mitt made of Turkish toweling padded on the inside with sponge and so arranged that the mitt may be used in either hand.

A further object of the invention is to provide a handle for the bath mitt made of wire and so constructed that it may be readily inserted within the bath mitt or removed therefrom, this handle permitting the bather to wash his back without difficulty and in an effective manner.

My invention is illustrated in the accompanying drawings, wherein:—

Figure 1 is a plan view of the device constructed in accordance with my invention;

Figure 2 is a sectional view on the line 2—2 of Figure 1;

Figure 3 is a sectional view on the line 3—3 of Figure 2;

Figure 4 is a plan view of the handle removed.

Referring to these drawings, it will be seen that 10 designates the bath mitt which is preferably made of Turkish toweling and preferably of a hard and tightly knitted Turkish toweling so that it will be durable and have a tendency to massage the skin and remove the dirt from the pores of the skin without irritating it as hard brushes sometimes do. This mitt is hollow and is closed at one end and open at the other end as at 11 and the mitt is formed of an outer and inner layer of Turkish toweling between which layers are disposed on opposite sides of the mitt the sponge masses 12 which may be of rubber sponge, natural sponge, portions of loofahs or other suitable material of like character, the sponge being held in place by stitching 13 passing through the two thicknesses of material forming the wall of the mitt and through the sponge. Preferably the two thicknesses of material are turned up on the inside and whipped at 14. Associated with the bath mitt is a handle preferably formed of a single length of wire, the wire being bent to provide two relatively rectangular portions 15 connected by U-shaped shanks 16, these shanks constituting a handle and being resilient so that the two shanks 16 act to hold the portions 15 spread apart from each other. Preferably at their angles the shanks are angularly curved as at 17. It is to be particularly noted that the sponge filling 12 does not extend to the extreme end of the mitt but terminates short thereof so as to accommodate the fingers beyond the filling or padding 12 so that the fingers may be flexed over one or the other of the sponges 12 and the bath mitt retained upon the hand.

The outwardly bent portions 17 also engage in the bath mitt beyond the two sponge pads 12 and thus act to hold the bath mitt in place upon the handle, but when the handle is compressed, that is the two rectangular frames 15 are forced toward each other the handle may be readily withdrawn from the bath mitt, readily inserted therein, and then allowed to expand after insertion so as to lock the bath mitt upon the handle. Preferably each of the frames 15 supports a web 18 of relatively fine wire netting or light screen wire which acts to form a support for the sponge pads 12 when the bath mitt is being used.

The advantage of the wire handle is that it may be made of spring wire so as to be readily inserted or withdrawn, that it will be rust-proof, and that the handle will not accumulate soapy water and thus become slippery. It will be obvious that one handle may be used for a number of mitts so that these mitts may be washed whenever desired. The handle may be made of any length found necessary and obviously slight changes may be made in the proportions of the parts without departing from the spirit of the invention.

I claim:—

1. A bath mitt formed of an outer layer of Turkish toweling, a lining and pads of spongeous material inserted between the lining and the outer layer of the material on each face of the bath mitt.

2. A bath mitt of absorbent material having two spongeous pads incorporated therewith, one on each face of the mitt, the mitt extending beyond the pads, and a handle for use therewith comprising two approximately rectangular frames having resilient handle portions adapted to urge the frames apart or be compressed to permit the insertion of the frames within the mitt, the extremities of the frames being bent outward to engage with the mitt beyond the spongeous pads, the frames being covered with reticulated material.

In testimony whereof I hereunto affix my signature.

ALFRED W. BELFRY.